Patented May 9, 1933

1,907,809

UNITED STATES PATENT OFFICE

FREDERICK A. HESSEL, OF NEW YORK, N. Y.

AIR CONDITIONING SUBSTANCE

No Drawing. Application filed March 27, 1929. Serial No. 350,440.

The present invention relates to air conditioning substances, and more particularly to a composite cast material capable of maintaining an environment immediately surrounding in a relatively moist condition while at the same time possessing a superficial surface which is dry to touch.

It has been the general practice heretofore to maintain the environment in a cabinet, show case, container or the like in a relatively moist condition by placing an open vessel containing water or an aqueous liquid within the cabinet or other closed chamber. Sometimes a sponge or a similar absorbent object was utilized as a reservoir for holding water and giving it off to the surrounding environment as the latter tended to become dry. The use of liquids and wetted absorbents was objectionable, as is well known, and various proposals were made to overcome the inherent disadvantages. Of these various proposals one of the more important was the suggestion of the utilization of divers organic and inorganic chemicals capable of giving off water. These chemicals were filled into jars and other vessels which were placed in cabinets or show cases for preventing the atmosphere therein from becoming dry. The use of jars or the like was inconvenient and some of the chemicals tended to dust off onto the articles being moistened and to give such articles a salty taste while some other chemicals tended to emit undesirable odors. For a variety of reasons, consequently, the use of a mass of chemicals held in a vessel in open contact with the articles being preserved was objectionable. Attempts were made to overcome the shortcoming of the aforesaid proposals by providing porous solid bodies which would absorb large quantities of water in a liquid condition in their pores. These porous bodies were damp and wet and were undesirable like wet sponges mentioned hereinbefore. None of the attempts insofar as I am aware was successful in providing a commercially satisfactory material capable of moistening environments within closed chambers such as cabinets.

I have discovered a composite material which overcomes the disadvantages and objections noted hereinabove and which provides a convenient and compact material to use for the maintenance of a humid condition in the air with which it is in contact. My discovery also contemplates the provision of a composite material, which is capable of casting into desired shapes and forms especially adapted for the purposes in hand and for the cabinet or closed chamber containing the articles to be preserved in a moistened condition, which has a dry feel when touched with the hand, and which is odorless and sanitary.

Other objects and features of the invention will become apparent from the following description.

The following example is given merely for the purposes of illustration in order to set forth my invention with clarity and particularity.

In the manufacture of my composite material I prefer to make a substantially saturated solution of an efflorescent salt which I have selected for incorporation in my composite material. A preferred salt is Glauber's salt ($Na_2SO_4 \cdot 10H_2O$) which is capable of evolving water vapor into a surrounding environment and of maintaining such environment in a humid condition. A saturated solution of this salt in water at 15° C., as one skilled in the art understands, contains one part Glauber's salt to two parts of water, and at 20° C., one part Glauber's salt in one part of water. I have found that a solution of the aforesaid type can be used to effect setting and hardening of plaster of Paris while at the same time preserving its efflorescent property in the cast material. The plaster of Paris is preferably mixed thoroughly with a strong solution of Glauber's salt and then is cast or is permitted to set in a mold or the like. The dry, cast composite material containing plaster of Paris and Glauber's salt maintains a humidity corresponding to that of the Glauber's salt. Even though the particles or crystals of the Glauber's salt are incorporated in the interstices or meshes of the solidified plaster of Paris, the salt is capable of evolving moisture which penetrates through the body of the material to the outer surfaces thereof and then to the encompassing or immediate environment.

The use of my cast composite material having a dry feel is obvious to one skilled in the art. If it is desired to maintain a cabinet containing cigars, for example, in a humid condition, a block of my material is placed in the cabinet and the material will automatically maintain the atmosphere in a humid condition for a relatively long period of time. In this manner the cigars, for instance, will be prevented from becoming dried out and unsaleable.

When my material is to be used in a container, box or the like, I prefer to cast a block or slab having the same shape and dimensions as a side of the box so that the cast block or slab will fit the container, box, or the like. In case a jar or can of tobacco is to be kept moist, I cast a thin disk which fits snugly in the cover of the jar or can. Of course, the block or slab of material may also be wrapped in a porous sheet material such as tissue.

In place of Glauber's salt, it is also possible to use magnesium sulphate

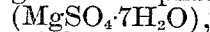

but as mentioned hereinbefore, I prefer to use Glauber's salt.

While I have given a specific example of my improved process merely by way of illustration, it is to be understood that I am not to be confined to the exact steps nor the specific reagents given as they are to be regarded only as illustrative and typical. Various modifications may be made without departing from the nature of my invention as defined in the appended claims.

I claim:

1. A composition of matter containing set plaster of Paris and a substantial amount of an efflorescent salt capable of evolving water vapor so as to effectively maintain the atmosphere in a chamber in a relatively humid condition.

2. A composition of matter containing set plaster of Paris and a substantial amount of Glauber's salt capable of evolving water vapor so as to effectively maintain the atmosphere in a chamber in a relatively humid condition.

3. A cast material adapted to maintain a surrounding environment within a closed chamber in a humid condition comprising set plaster of Paris with a substantial amount of Glauber's salt incorporated throughout the interstices of said set plaster of Paris, said Glauber's salt being in an efflorescent condition capable of evolving water vapor so as to effectively maintain the said chamber in humid condition.

4. The manufacture of a cast material adapted to maintain a surrounding environment within a closed chamber in a humid condition which comprises mixing plaster of Paris with a strong solution of an efflorescent salt and then permitting said plaster of Paris to set and harden with the said salt distributed therethrough in an efflorescent condition capable of evolving water vapor so as to effectively maintain the atmosphere in said chamber in a humid condition.

5. The manufacture of a cast material adapted to maintain a surrounding environment within a closed chamber in a humid condition which comprises mixing plaster of Paris with a strong solution of Glauber's salt and then casting said mixture in a form to produce a cast and hardened composite material having a dry feel and being capable of evolving water vapor from the crystallized Glauber's salt distributed through said cast and hardened plaster of Paris.

In testimony whereof I have hereunto set my hand.

FREDERICK A. HESSEL.